Patented Oct. 16, 1923.

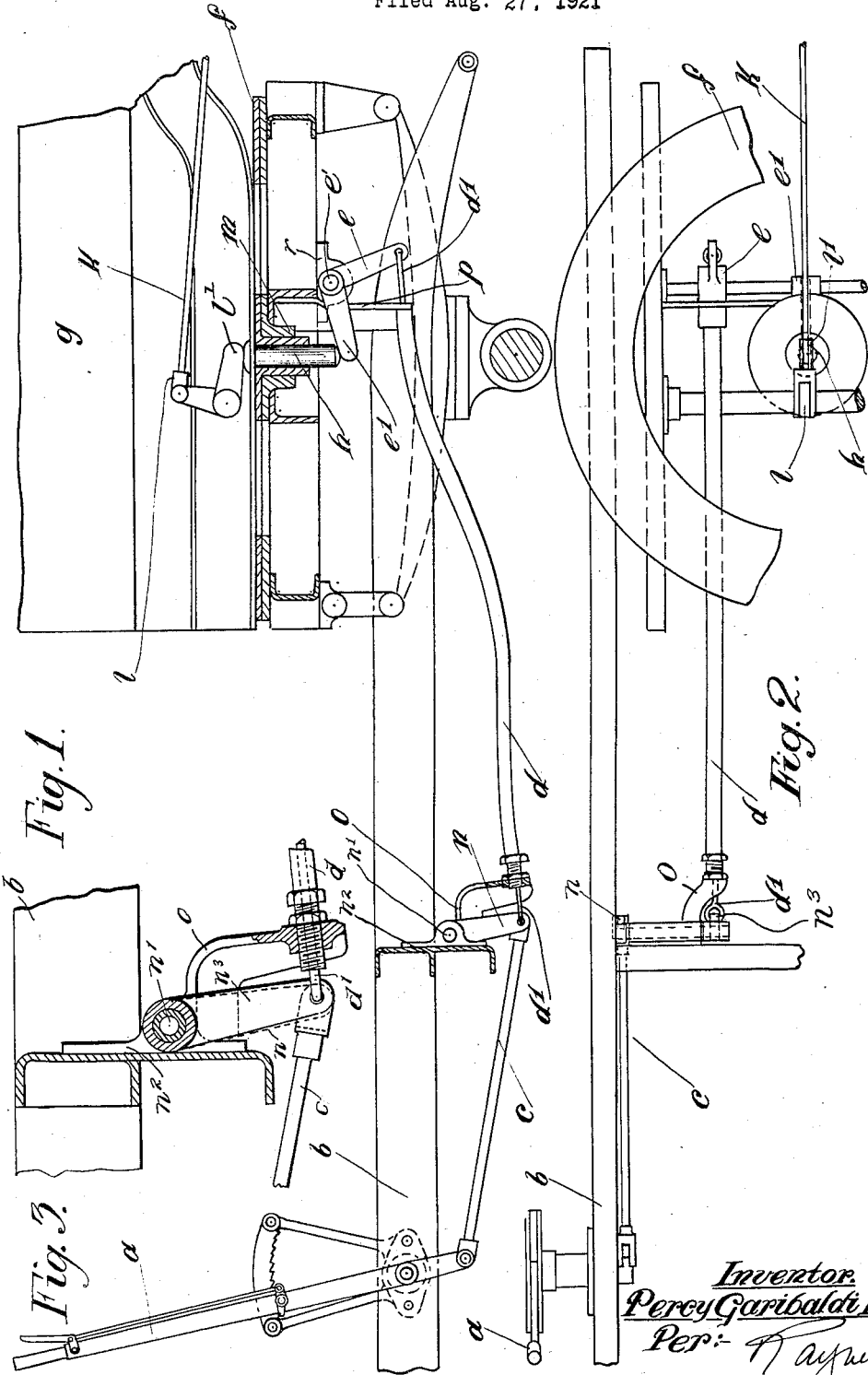

1,470,620

UNITED STATES PATENT OFFICE.

PERCY GARIBALDI HUGH, OF SOUTHEND, ENGLAND.

BRAKE MECHANISM FOR MOTOR VEHICLES.

Application filed August 27, 1921. Serial No. 496,133.

*To all whom it may concern:*

Be it known that I, PERCY GARIBALDI HUGH, of 122 Eastern Esplanade, Southend-on-Sea, in the county of Essex, England, a subject of the King of Great Britain and Ireland, have invented a new and useful Improvement in Brake Mechanism for Motor Vehicles, of which the following is a specification.

My invention relates to brake mechanism more particularly in connection with motor lorries of the "six wheel" type in which the forward part is the power chassis or tractor and the rear part the load carrying body hereinafter referred to as the trailer. In carrying out my invention it is necessary that the brake mechanism of the load carrying body is operated by a hand lever located by the driver's seat on the power chassis.

As occasion may arise that would make it necessary to temporarily remove the load carrying body from the power chassis it is desirable to provide a ready means for connecting or disconnecting the brake gear without affecting the adjustment thereof. Further as the trailer must be free to turn relative to the tractor and also oscillate due to the compression and distension of the springs, it is necessary to provide means to counter-balance these movements so that the brake may be fully reliable, and the object of my invention is to provide efficient means for obtaining this result.

According to the invention, the hollow perch pin or pivot connecting the two parts of the vehicle, is provided with a rotatable and vertically slidable bolt mounted co-axially therewith, and adapted to be moved vertically by a ball-crank lever located beneath the lower end of said bolt, and operated by a brake lever arranged near the driver's seat on the tractor through the internal member of a flexible connection. The load carrying body carries a bell-crank lever pivotally mounted to the frame of said body and located above the slidable bolt so as to transmit the motion of said bolt to suitable brakes on the wheels of said load carrying body.

In order that my invention may be more readily understood reference is made to the accompanying drawings, in which:—

Figure 1 represents a sectional elevation of my invention, and

Figure 2 a plan thereof.

Figure 3 is an enlarged detail view.

In carrying out my invention, I provide the usual pivotally mounted lever $a$ on the tractor $b$ and to the lower end of this lever $a$ is attached the forward end of a connecting rod $c$ (or a suitable flexible connection such as $d^1$) extending rearwardly to a pivoted bell crank lever $e$ mounted underneath a turntable $f$ on which is mounted the forward end of the trailer $g$. In the construction illustrated the rear end of the rod $c$ is connected to a lever $n$ pivoted at $n^1$ to a bracket $n^2$ on the power chassis frame. Integral with the bracket $n^2$ is a downwardly extending arm $o$ perforated for the passage of a flexible cable $d^1$ the forward end of which is attached to the lever $n$, and the extending arm $o$ also forms an abutment for one end of a flexible tubular member $d$ which contains and guides the flexible cable $d^1$. The rear end of the flexible tubular member $d$ abuts and is attached to a downwardly extending frame member $p$ and the rear end of the flexible cable $d^1$ is attached to arm $e$ of a bell crank lever pivotally mounted upon a bracket $r$ fixed to part of the frame of turntable $f$. The second arm $e^1$ of the bell crank lever before referred to is in engagement with the lower end of a bolt $h$ slidably mounted in a vertical hole in the hollow perch pin $m$ in the turn table or body $f$. On the rear wheels of the load carrying body is arranged the usual brake mechanism, and the operating rod $k$ for the same extends forwardly. The forward end of this connecting rod is pivotally attached to a bell crank lever $l$ mounted in the forward end of the frame members of the trailer. The second arm $l^1$ of this bell crank lever $l$ is in operative relation to the top of the slidably mounted bolt $h$ above referred to, i. e., the end of this bell crank lever $l^1$ is vertically arranged over the end of the first referred to bell crank lever arm $e^1$, the slidably mounted bolt $h$ forming the operative connection between the two bell crank levers. It will be obvious that when the operating lever $a$ is moved rearwardly to set the brake, the end of the second arm $e^1$ of the first bell crank lever $e$ referred to will be so operated as to move the slidably mounted bolt $h$ upwardly, causing an upward movement of the end of the arm $l^1$ of the bell crank lever mounted upon the load carrying body, and will operate the upper end of the other arm $l$, thus moving the connecting rod $k$ attached to the rear brakes not shown forwardly, setting the brakes. Also it will be obvious that if the hollow perch pin $m$ is removed to sever the connection between the forward end of the load carrying frame and the turn table, the brake mechanism on the load carrying frame is not disturbed in any way, the connection being simply broken at the slidably mounted pin $h$.

I claim:—

In brake mechanism for motor vehicles having a tractor and a trailer pivotally connected, the combination of a rotatable and vertically displaceable bolt mounted coaxially in a hollow perch pin, a lever mounted on the front part of the trailer and having one end in engagement with the top of the said bolt, a connection from the other end of this lever to at least one brake, a shaft mounted on the rear part of the tractor, a lever on this shaft whose end engages the lower end of the bolt, a second lever on the shaft, a flexible cable connected to the end of this lever, a tubular casing surrounding this flexible cable, a short shaft mounted on the tractor frame, a lever on this shaft to which the other end of the flexible cable is connected, a second lever on this shaft and a connection from this second lever to the brake lever.

PERCY GARIBALDI HUGH.